(12) United States Patent
Chuang (10) Patent No.: US 9,115,887 B2
(45) Date of Patent: Aug. 25, 2015

(54) ILLUMINATED WATER BOTTLE CAGE

(71) Applicant: Louis Chuang, Taichung (TW)

(72) Inventor: Louis Chuang, Taichung (TW)

( * ) Notice: Subject to any disclaimer, the term of this patent is extended or adjusted under 35 U.S.C. 154(b) by 0 days.

(21) Appl. No.: 14/217,768

(22) Filed: Mar. 18, 2014

(65) Prior Publication Data

US 2014/0286012 A1 Sep. 25, 2014

(30) Foreign Application Priority Data

Mar. 19, 2013 (TW) .............................. 102205010 U (51) Int. Cl.
*B62J 11/00* (2006.01)
*F21V 33/00* (2006.01)
*F21Y 101/02* (2006.01)

(52) U.S. Cl.
CPC ............... *F21V 33/008* (2013.01); *B62J 11/00* (2013.01); *F21Y 2101/02* (2013.01)

(58) Field of Classification Search
CPC ............ B62J 11/00; B62J 6/00; F21V 33/008
USPC ................................... 362/473, 253; 244/414
See application file for complete search history.

(56) References Cited

U.S. PATENT DOCUMENTS

| | | | | |
|---|---|---|---|---|
| 6,321,961 B1* | 11/2001 | McDaid et al. | ............... | 224/442 |
| 6,971,759 B2* | 12/2005 | Sutton | ........................... | 362/101 |
| 8,469,381 B2* | 6/2013 | Dodman et al. | ........... | 280/281.1 |
| 8,893,837 B2* | 11/2014 | Kwag et al. | ................... | 180/68.5 |
| 2014/0022768 A1* | 1/2014 | Midence | ....................... | 362/154 |

FOREIGN PATENT DOCUMENTS

CN 201484558 U 5/2010

* cited by examiner

*Primary Examiner* — Peggy Neils
(74) *Attorney, Agent, or Firm* — Alan D. Kamrath; Kamrath IP Lawfirm, P.A.

(57) ABSTRACT

An illuminated water bottle cage includes a holder base having a light transmission section and a lighting device. The holder base includes a coupling portion able to be mounted to a bicycle. The holder base includes a receiving space extending along a longitudinal axis of the holder base to receive a water bottle. The light transmission section includes an incident portion and a light guiding portion. The lighting device is mounted in the light transmission section. A light source of the lighting device is projected onto the incident portion, allowing light beams projected onto the incident portion to be transmitted to the light guiding portion, and diffusing the light source of the lighting device to the light transmission section to achieve the effect of diffusing the light source of the lighting device, the light scattering area can effectively be increased to enhance the function of nighttime warning.

13 Claims, 9 Drawing Sheets

ILLUMINATED WATER BOTTLE CAGE

BACKGROUND OF THE INVENTION

The present invention relates to an illuminated water bottle cage and, more particularly, to an illuminated water bottle cage including a light transmission section onto which a light source of a light device projects such that the light transmission section of the water bottle cage diffuses the light source to thereby increase the light scattering area.

Traditionally, a water bottle cage with a lighting function can be mounted to a bicycle frame for holding a water bottle. The water bottle cage includes a bottle cage seat and at least one light unit. The bottle cage seat includes a fixing portion to be fixed to the bicycle frame and a water bottle carrier portion defining a receiving space for receiving the water bottle. The lighting unit is mounted to the water bottle carrier portion. A lighting effect can be provided at night by the lighting unit on the bottle cage seat.

However, consumers generally purchase water bottle cages having a low price. Since the price of the water bottle cage is limited, the lighting unit can only use a low-cost lamp as the light source. The essential alarm/illumination effect at night is, thus, poor. Since the lamp of the lighting unit does not provide a reflective shield for the lighting unit, the human eyes can only see weak point sources of light at night, failing to provide the real effect of nighttime warning.

If a reflective cover is added to increase the light-concentrating ability of the lighting element, the costs will be too high, and the whole lamp becomes bulky. The appearance of the water bottle cage is towering after mounting the bulky lamp onto the water bottle cage. Furthermore, the mounting is inconvenience, occupies a relatively large space, and even cannot fulfill the demand of light and handy and, thus, cannot be accepted by consumers.

Furthermore, the lighting unit is mounted in a front of the bottle cage seat. Namely, the lighting unit is located on a front edge of a bottle receiving space and is liable to damage due to collision with other objects.

Furthermore, the lighting unit mounted in the front of the bottle cage seat is apt to accumulate sand and dust or damage by rainwater. The service life of the lighting unit is shortened if the cyclist rides through a muddy area or in a rainy day.

In view of the above technical problems of the prior art that cannot be effectively solved and overcome, the present applicant files this patent application to solve the above problems.

BRIEF SUMMARY OF THE INVENTION

An illuminated water bottle cage according to the present invention includes a holder base having a light transmissions section and a lighting device. The holder base includes a coupling portion on a side thereof. The coupling portion is adapted to be mounted to a bicycle. The holder base includes a receiving space extending along a longitudinal axis of the holder base. The receiving space is adapted to receive a water bottle. The light transmission section includes an incident portion and a light guiding portion. The lighting device is mounted in the light transmission section of the holder base. A light source of the lighting device is projected onto the incident portion of the light transmission section, allowing light beams projected onto the incident portion to be transmitted to the light guiding portion, and diffusing the light source of the lighting device to the light transmission section of the holder base. By using the light transmission section of the holder base to achieve the effect of diffusing the light source of the lighting device, the light scattering area can effectively be increased to enhance the function of nighttime warning.

The illuminated water bottle cage according to the present invention uses a small-size light-emitting diode as a lighting element without the need of increasing the size of the lighting element and without the need of adding a reflective cover, effectively controlling the manufacturing costs and saving electricity while essentially increasing the light scattering area of the illuminated water bottle cage and indeed enhancing the effect of nighttime warning.

In the illuminated water bottle cage according to the present invention, a back, a bottom, and a sliding block of a restraining portion of the holder base are made of transparent or translucent materials. The back, the bottom, and the sliding block the restraining portion of the holder base form the light transmission section. Namely, the incident portion of the holder base is aligned with the light source of the lighting device. The back, the bottom, and the sliding block of the holder base directly form the light guiding portion. However, the present invention is not limited to this arrangement. A light transmission section formed by the whole holder base is an equivalent arrangement within the scope of the present invention.

In the illuminated water bottle cage according to the present invention, the holder base includes a groove adjacent to the incident portion. The lighting device is mounted in the groove. The light source of the lighting device is aligned with the incident portion of the light transmissions section. Thus, the lighting device will not collide with an alien object, avoiding damage due to collision.

In the illuminated water bottle cage according to the present invention, a soft button is mounted between the through-hole of the holder base and the switch of the lighting device, and a seal ring is mounted between the opening of the holder base and the cover of the lighting device. The soft button and the seal ring can prevent dust from entering the groove to achieve a dust-preventing effect and a rainproof effect, effectively prolonging the service life.

If the illuminated water bottle cage according to the present invention is out of electricity, the user can detach the cover from the holder base by the actuating portions on the upper and lower sides of the cover and then replace a new battery. Then, the cover is pushed back into the groove of the holder base. It is not necessary to detach the illuminated water bottle cage from the bicycle during replacement of the battery, which is very simple and convenient in use.

Other objectives, advantages, and novel features of the present invention will become clearer in light of the following detailed description described in connection with the accompanying drawings.

DETAILED DESCRIPTION OF THE INVENTION

Figure 1:
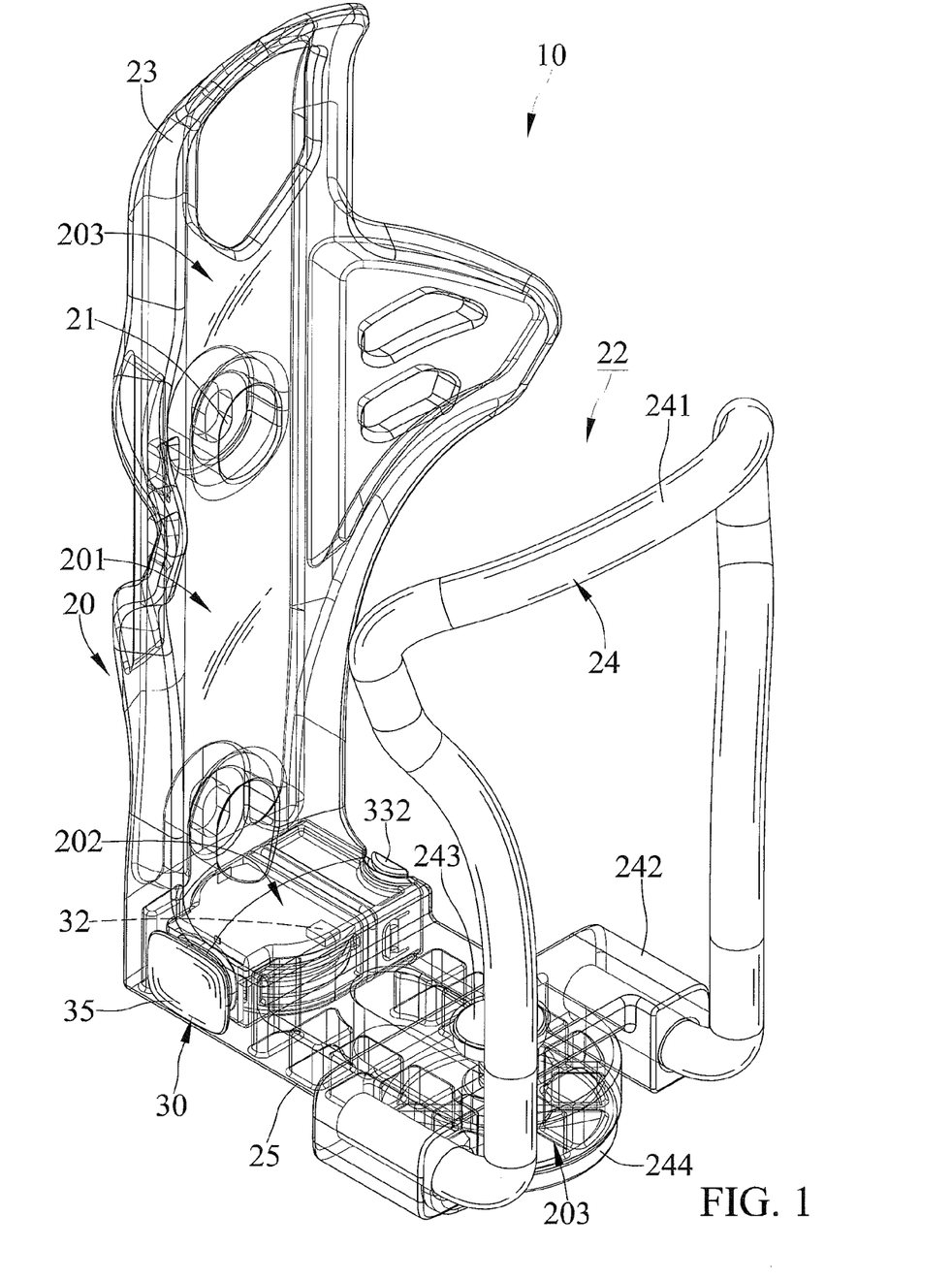
FIG. 1 is a perspective view of an illuminated water bottle cage of a first embodiment according to the present invention.
Figure 2:
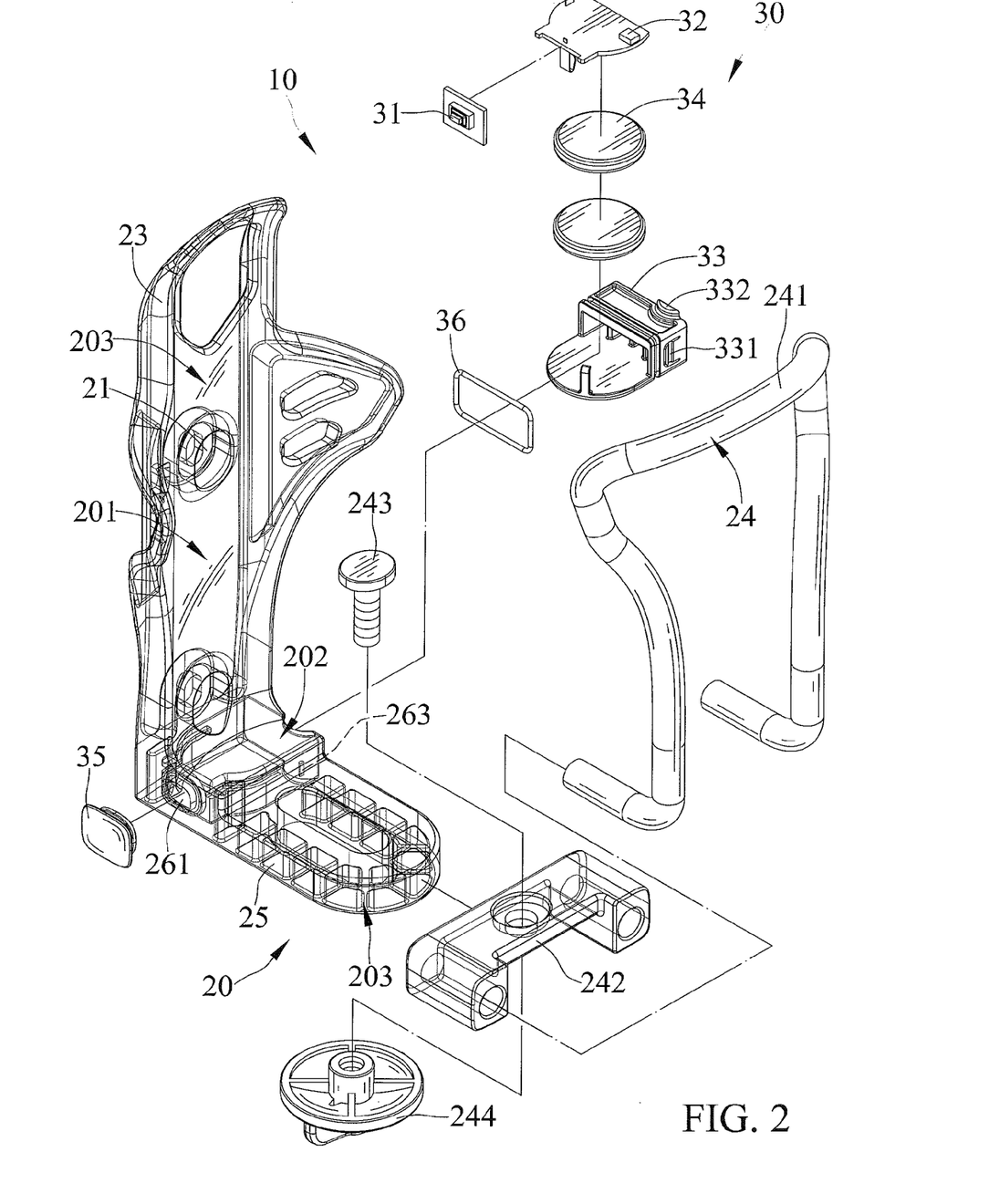
FIG. 2 is an exploded, perspective view of the illuminated water bottle cage of the first embodiment according to the present invention.

FIGS. 1 and 2 show an illuminated water bottle cage 10 of a first embodiment according to the present invention. The illuminated water bottle cage 10 of this embodiment includes a holder base 20 and a lighting device 30. The holder base 20 includes a light transmission section 201 onto which a light source of the lighting device 30 projects such that the light transmission section 201 of the water bottle cage 10 diffuses the lighting source to thereby increase the light scattering area, enhancing the function of nighttime warning.

Figure 3:
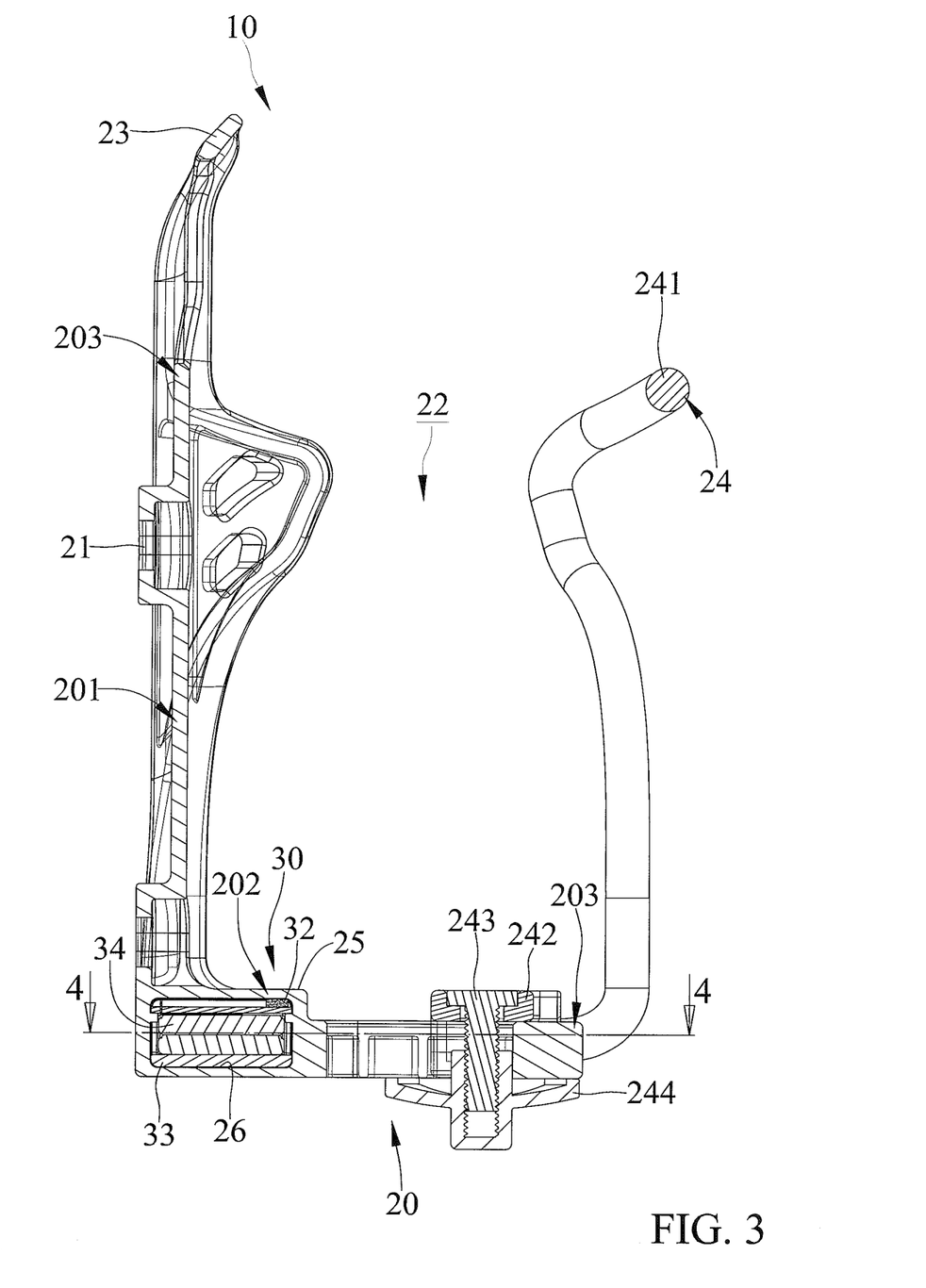
FIG. 3 is a longitudinal cross sectional view of the illuminated water bottle cage of the first embodiment according to the present invention.

With reference to FIG. 3, the holder base 20 includes a coupling portion 21 on a side thereof. The coupling portion 21 is adapted to be mounted to a bicycle. The holder base 20 includes a receiving space 22 extending along a longitudinal axis of the holder base 20. The receiving space 22 is adapted to receive a water bottle.

The holder base 20 includes a light transmission section 201. The light transmission section 201 includes an incident portion 202 and a light guiding portion 203. The light beams projected from the lighting device 30 onto the incident portion 202 can be transmitted to the light guiding portion 203. The light transmission section 201 of the holder base 20 is made of a transparent or translucent material such that the light beams can transmit the light transmission section 201.

The holder base 20 includes a back 23 connected to the coupling portion 21, a restraining portion 24 for restraining the water bottle, and a bottom 25 for supporting the water bottle. The back 23, the restraining portion 24, and the bottom 25 together define the receiving space 22. The back 23 and the restraining portion 24 are located in a radial direction of the receiving space 22 to restrain movement of the water bottle in the radial direction. The bottom 25 is located below the receiving space 22 for supporting a weight of the water bottle.

Figure 4:
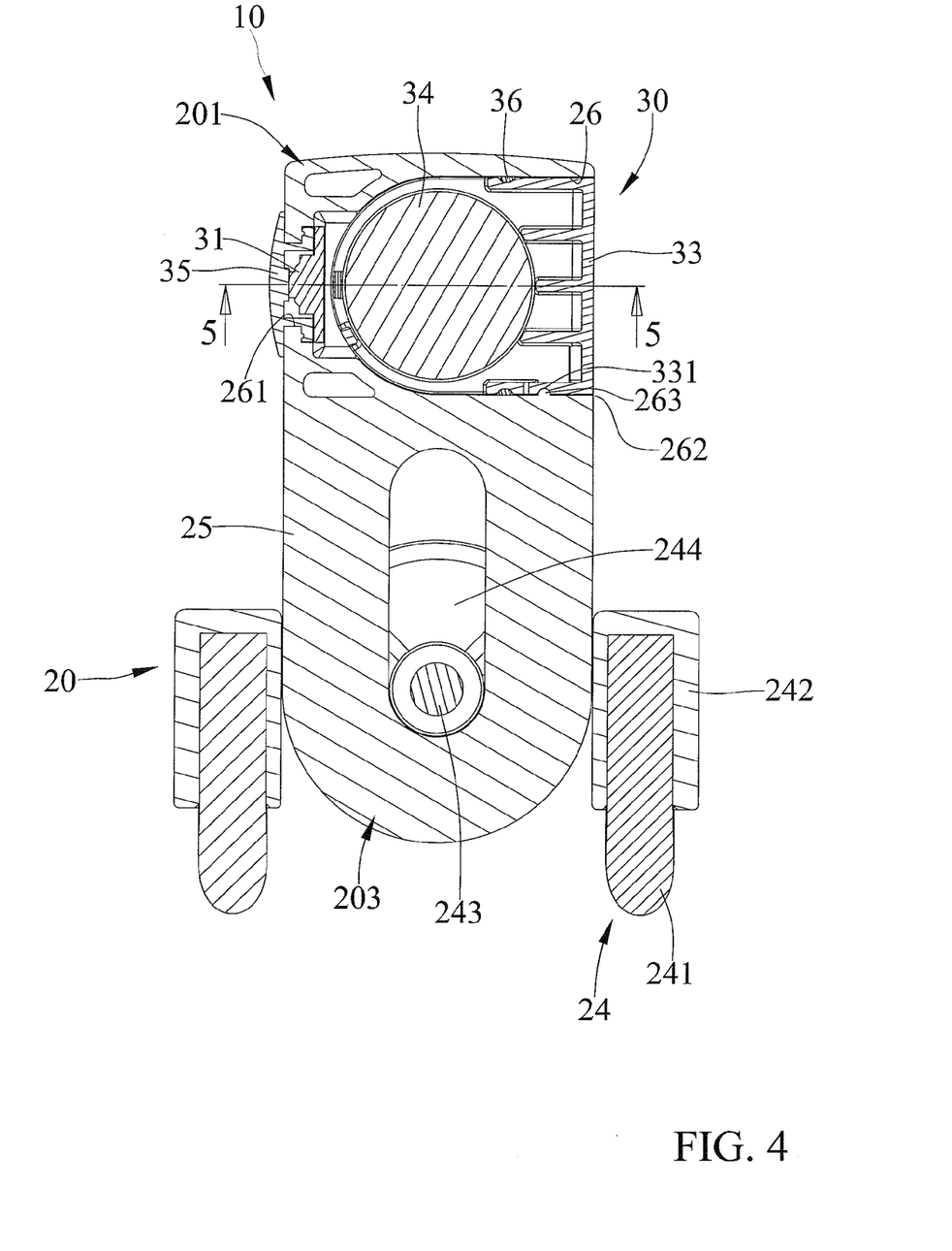
FIG. 4 is a cross sectional view of the illuminated water bottle cage according to the present invention taken along section line 4-4 of FIG. 3.
Figure 5:
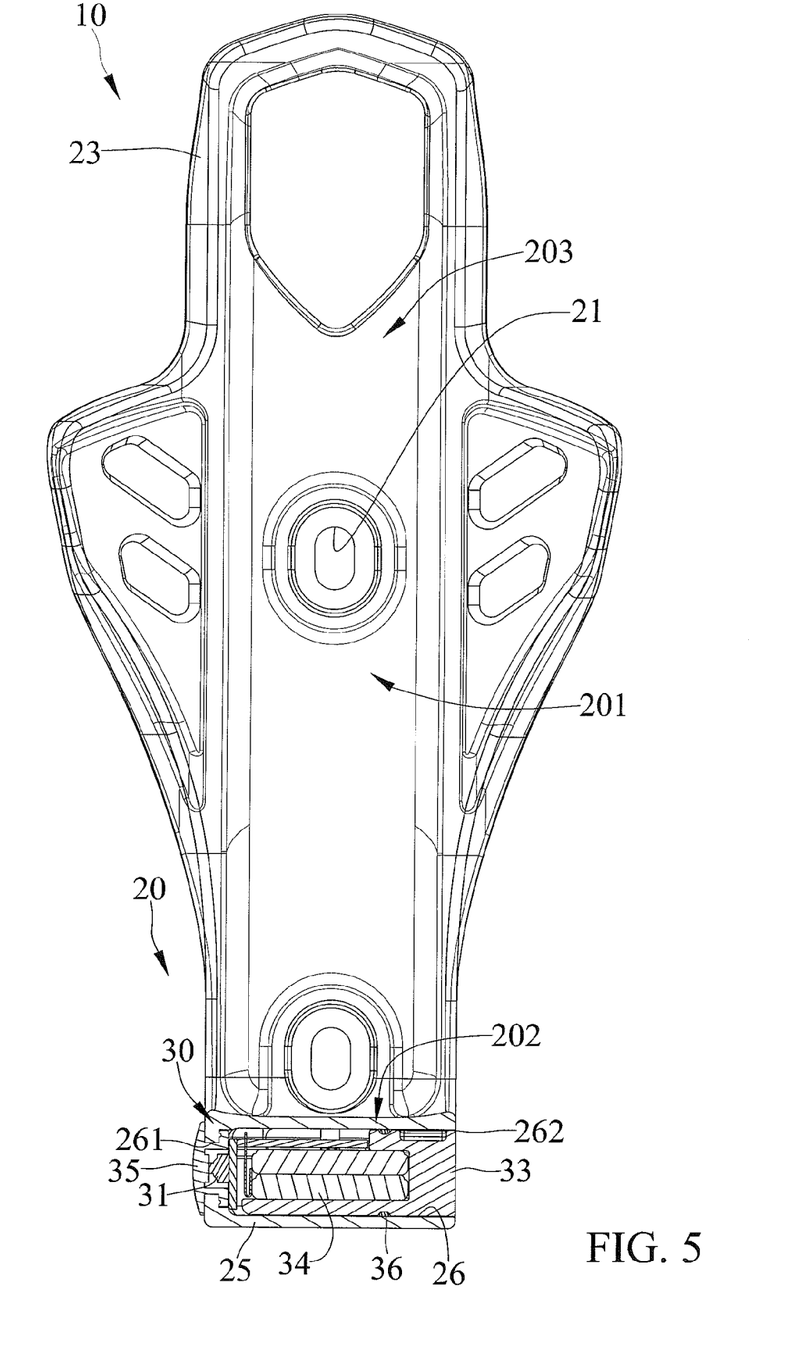
FIG. 5 is a cross sectional view of the illuminated water bottle cage according to the present invention taken along section line 5-5 of FIG. 4.

With reference to FIGS. 4 and 5, the holder base 20 includes a groove 26 adjacent to the incident portion 202. The groove 26 includes a through-hole 261 and an opening 262. The opening 262 and the through-hole 261 are located on opposite sides of the holder base 20. An engaging protrusion 263 is formed in the groove 26 and is located adjacent to the opening 262.

In this embodiment, the back 23 and the bottom 25 of the holder base 20 are integrally connected with each other. The groove 26 is formed in an intersection between the back 23 and the bottom 25. The restraining portion 24 is slideably mounted to the bottom 25 of the holder base 20 such that the restraining portion 24 can move towards or away from the back 23 to achieve an effect of adjusting size of the receiving space 22 for water bottles of various sizes.

The restraining portion 24 includes an enclosure frame 241, a sliding block 242 mounted to a bottom of the enclosure frame 241, a threaded member 243 extending through the sliding block 242 and the bottom 25, and a rotary wheel 244 in threading connection with the threaded member 243. The rotary wheel 244 is adapted to be operated by the user to tighten or loosen the threaded member 243 for adjusting a position of the restraining portion 24 or fixing the restraining portion 24.

The lighting device 30 is mounted in the light transmission section 201 of the holder base 20. The light source of the lighting device 30 can be projected onto the incident portion 202 of the light transmission section 201, allowing the light beams projected onto the incident portion 202 to be transmitted to the light guiding portion 203, and the light source of the lighting device 30 diffuses to the light transmission section 201 of the holder base 20 such that the light transmission section 201 of the holder base 20 can achieve an effect of nighttime warning.

The lighting device 30 is mounted in the groove 26 adjacent to the incident portion 202. The lighting device 30 includes a switch 31, a lighting element 32, and a cover 33. The switch 31 is fixed in the through-hole 261 of the holder base 20. The switch 31 is adapted to be pressed by the user via the through-hole 261. The lighting element 32 is fixed in the groove 26 of the holder base 20 and is connected to the switch 31. The light source of the lighting element 32 is aligned with the incident portion 202 of the holder base 20, such that the light source of the lighting element 32 can be projected onto the incident portion 202 of the light transmission section 201. The cover 33 is detachably mounted in the opening 262 of the holder base 20. The cover 33 is adapted to receive a battery 34 for supplying power to the lighting element 32. The cover 33 includes a hook 331 in a location corresponding to the engaging protrusion 263 of the groove 26. The hook 331 can engage with the engaging protrusion 263 of the groove 26 to prevent the cover 33 from inadvertently disengaging from the groove 26. The cover 33 includes an actuating portion 332 on each of upper and lower sides of the cover 33. The actuating portions 332 are exposed outside of the opening 262 of the groove 26, allowing the user to detach the cover 33 from the holder base 20.

A soft button 35 is mounted between the through-hole 261 and the switch 31. A seal ring 36 is mounted between the opening 262 and the cover 33. The soft button 35 and the seal ring 36 are adapted to prevent dust from entering the groove 26 to achieve a dust-preventing effect and a rainproof effect.

Figure 6:
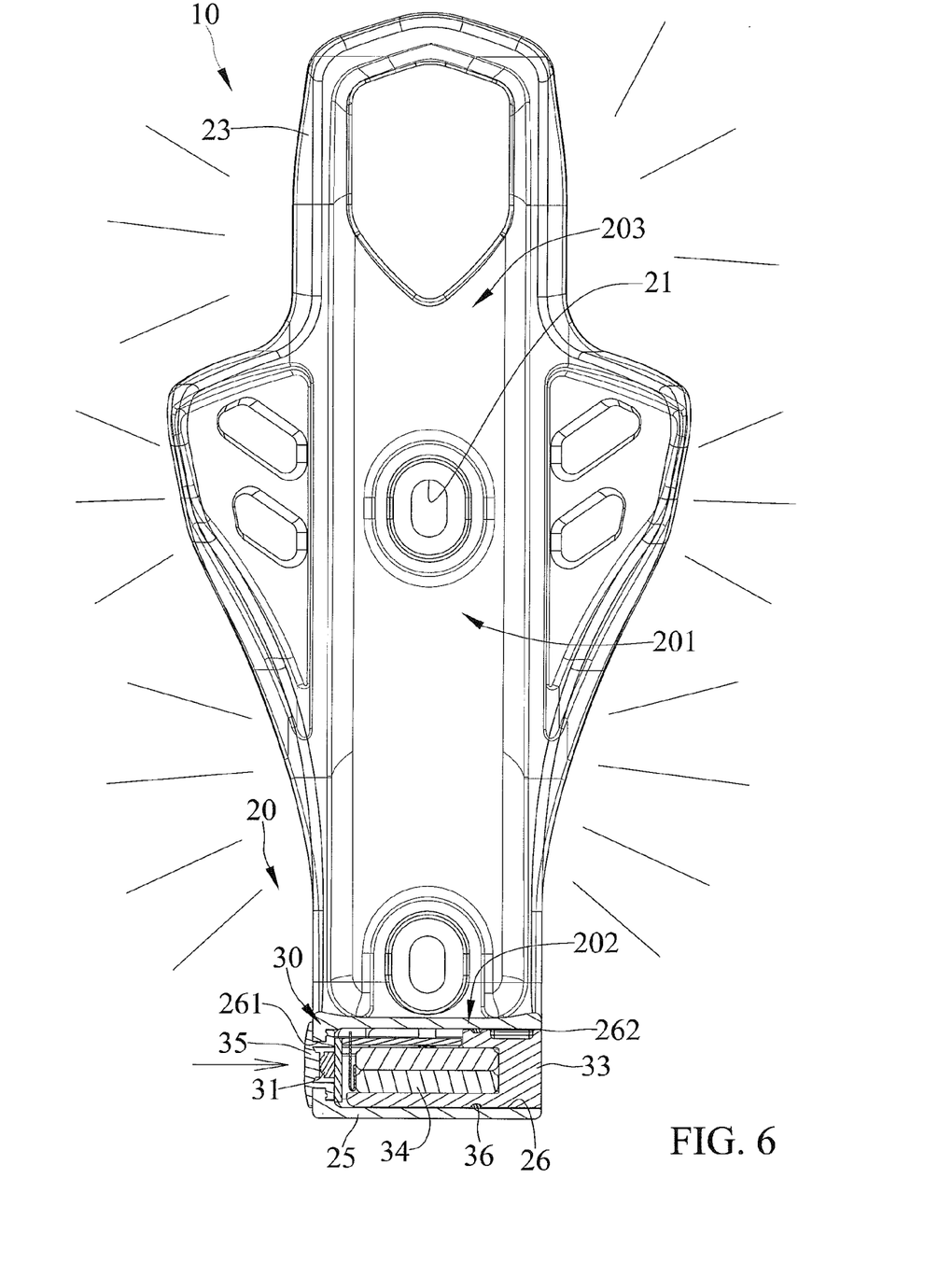
FIG. 6 is a view similar to FIG. 5, with a switch of a lighting device pressed to diffuse a light source by a light transmission section of a holder base for increasing the light scattering area.
Figure 7:
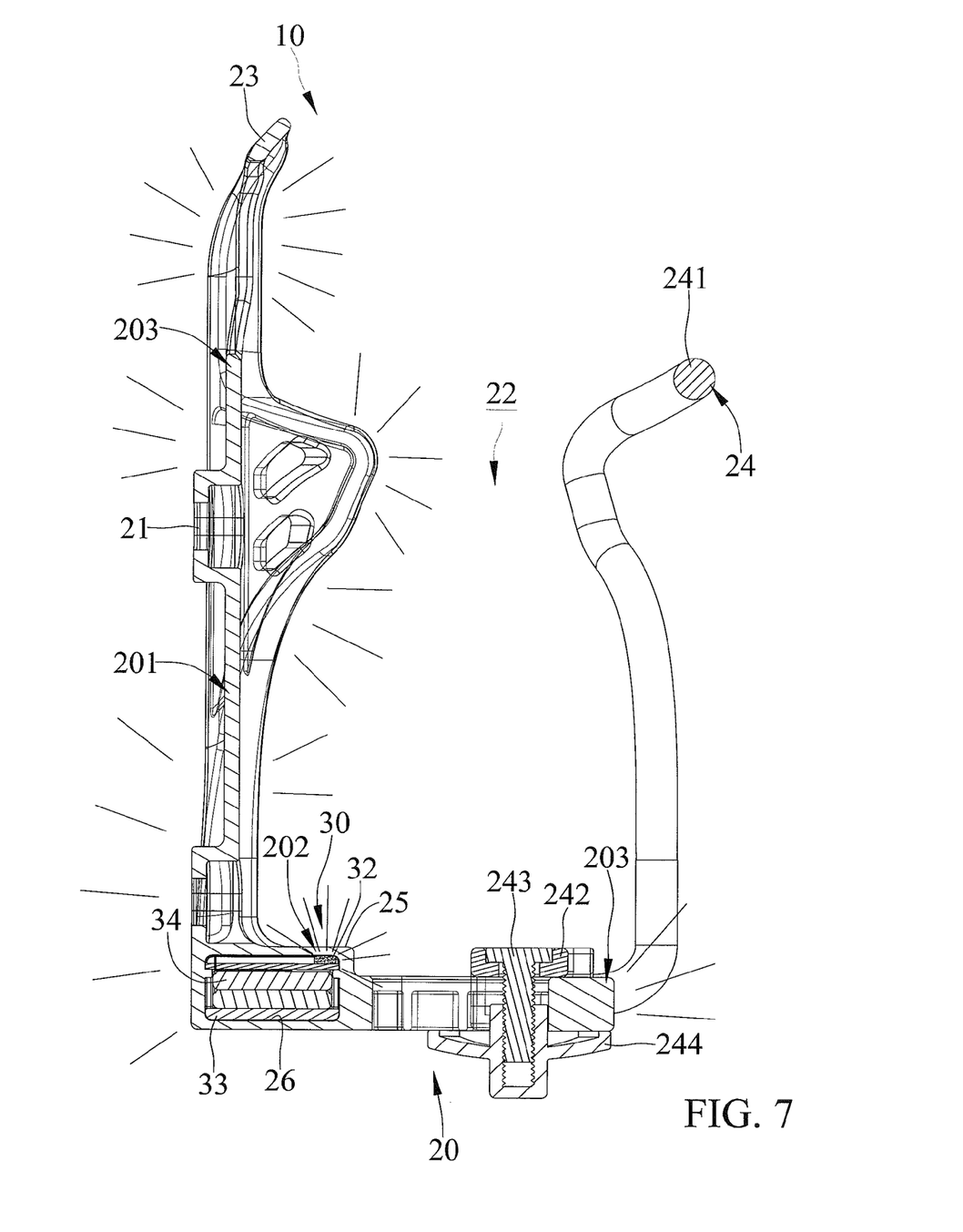
FIG. 7 is a longitudinal cross sectional view of the illuminated water bottle cage according to the present invention, with the light transmission section of the holder base diffusing the light source to increase the light scattering area.

FIGS. 6 and 7 show an illuminating state of the illuminated water bottle cage 10 according to the present invention. After the user presses the switch 31, the lighting element 32 generates a light source that is projected onto the incident portion 202 of the light transmission section 201 of the holder base 20. The light beams projected onto the incident portion 202 can be transmitted to the light guiding portion 203 to diffuse the light beams to the outside of the holder base 20 via the light guiding portion 203, such that the light transmission section 201 of the holder base 20 generates a floodlight effect due to light scattering. Since the illuminated water bottle cage 10 according to the present invention not only uses the light source of the lighting device 30 to provide the effect of nighttime warning but uses the light transmission section 201 of the holder base 20 to achieve an effect of diffusing the light source of the lighting device 30, the light scattering area is effectively increased and the function of nighttime warning is indeed enhanced.

Furthermore, the illuminated water bottle cage 10 according to the present invention uses a small-size light-emitting diode as the lighting element 32 without the need of increasing the size of the lighting element 32 and without the need of adding a reflective cover, effectively controlling the manufacturing costs and saving electricity while essentially increasing the light scattering area of the illuminated water bottle cage 10 and indeed enhancing the real effect of nighttime warning.

Figure 8:
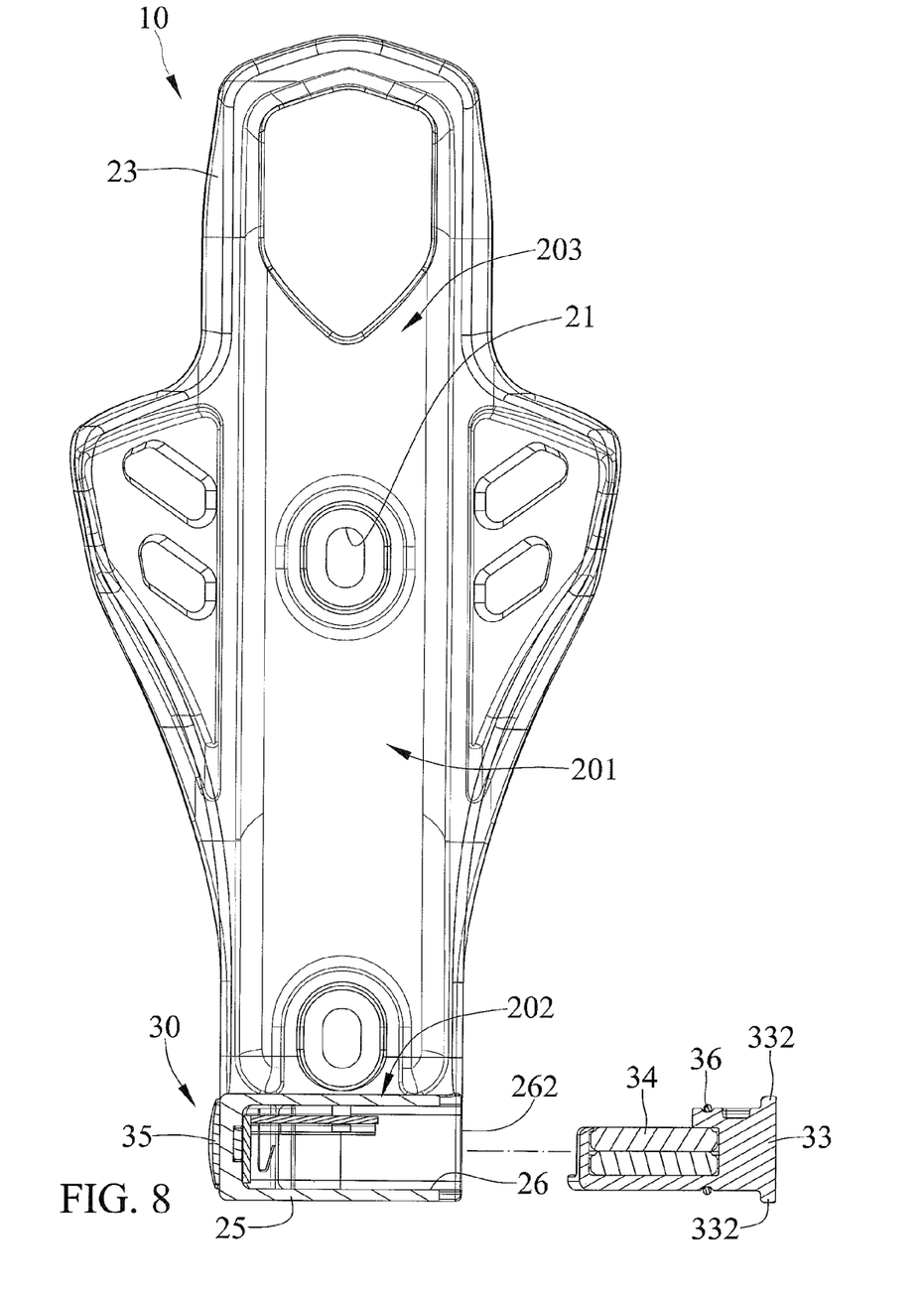
FIG. 8 is a view illustrating a state of the illuminated water bottle cage according to the present invention after detachment of a cover.

FIG. 8 shows a state of the illuminated water bottle cage 10 according to the present invention after detachment of the cover 33 of the lighting device 30. If the battery 34 in the lighting device 30 is out of electricity, the user can detach the cover 33 from the holder base 20 by the actuating portions 332 on the upper and lower sides of the cover 33 and then replace a new battery 34. Then, the cover 33 is pushed back into the groove 26 of the holder base 20. It is not necessary to detach the illuminated water bottle cage 10 from the bicycle during replacement of the battery 34, which is very simple and convenient in use.

In this embodiment, the back 23, the bottom 25, and the sliding block 242 of the restraining portion 24 of the holder base 20 are made of transparent or translucent materials. The back 23, the bottom 25, and the sliding block 242 the restraining portion 24 of the holder base 20 form the light transmission section 201. Namely, the incident portion 202 of the holder base 20 is aligned with the light source of the lighting device 30. The back 23, the bottom 25, and the sliding block 242 of the holder base 20 directly form the light guiding portion 203 to achieve the effect of diffusing the light source and increasing the light scattering area. However, the present invention is not limited to this arrangement. A light transmission section 201 formed by the whole holder base 20 is an equivalent arrangement within the scope of the present invention.

Figure 9:
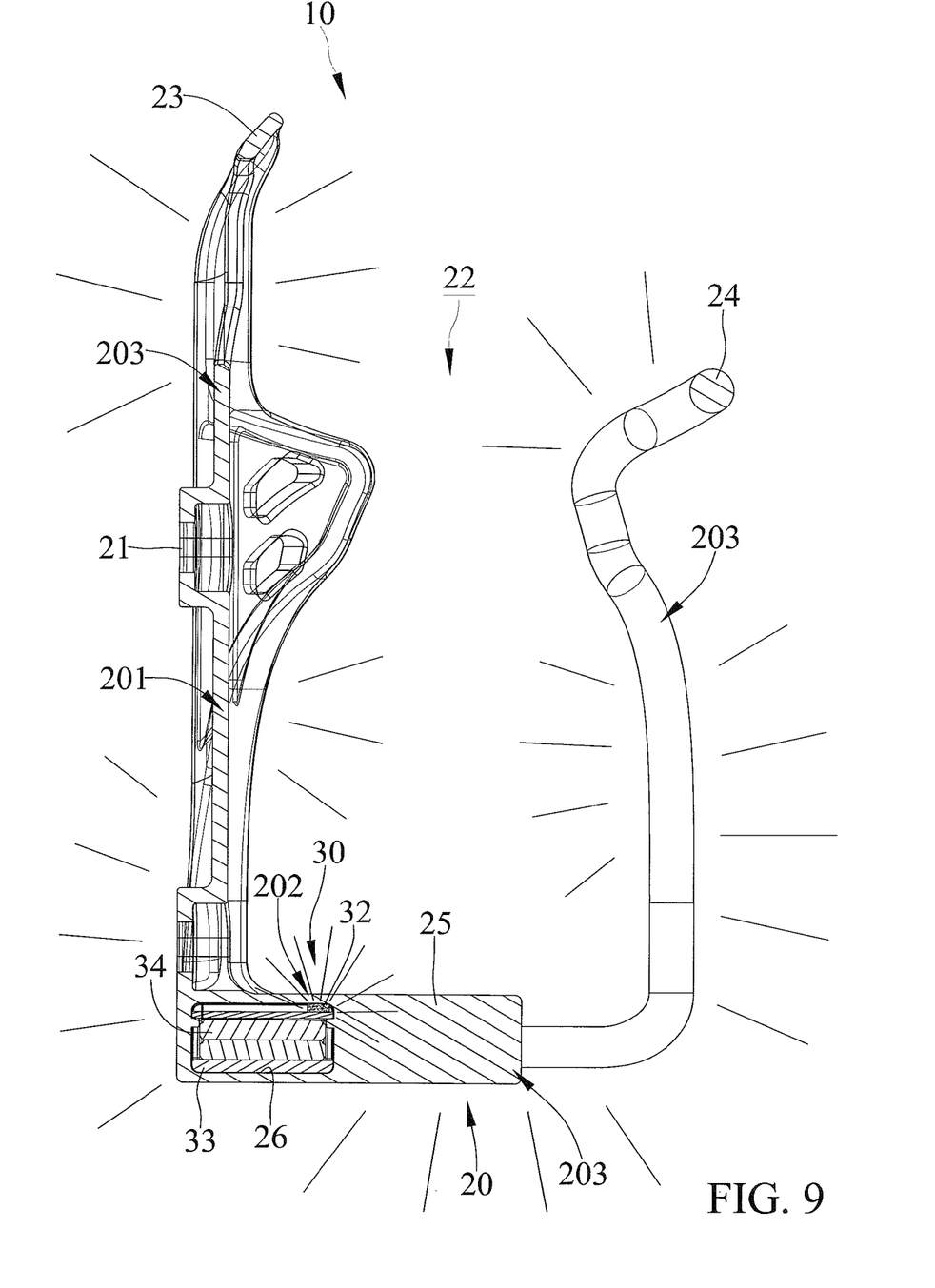
FIG. 9 is a longitudinal cross sectional view of an illuminated water bottle cage of a second embodiment according to the present invention, with the whole holder base being the light transmission section such that the whole holder base can diffuse the light source to increase the light scattering area.

FIG. 9 shows an illuminated water bottle cage 10 of a second embodiment according to the present invention. This embodiment is substantially the same as the above embodiment except that the back 23, the bottom 25, and the restraining portion 24 of the holder base 20 are integrally connected with each other, and the groove 26 is formed in an intersection between the back 23 and the bottom 25.

By such an arrangement, the back 23, the bottom 25, and the restraining portion 24 of the holder base 20 are made of transparent or translucent materials. The back 23, the bottom 25, and the restraining portion 24 of the holder base 20 form the light transmission section 201. Namely, the incident portion 202 of the holder base 20 is aligned with the light source of the lighting device 30. The back 23, the bottom 25, and the restraining portion 24 of the holder base 20 directly form the light guiding portion 203. This also achieves the effect of diffusing the light source of the lighting device 30 by the light transmission section 201 of the holder base 20, effectively increasing the light scattering area of the water bottle cage 10 and increasing the function of nighttime warning. This is the design of the light transmission section 201 formed by the whole holder base 20, providing the advantages and effects of lighting the whole holder base 20.

In view of the foregoing, the present invention has the following advantages:

1. The illuminated water bottle cage according to the present invention includes a holder base having a light transmission section and a lighting device. The light transmission section includes an incident portion and a light guiding portion. The lighting device is mounted to the light transmission section of the holder base. The light source of the lighting device is projected onto the incident portion of the light transmission portion, allowing the light beams projected onto the incident portion to be transmitted to the light guiding portion via the guiding portion to thereby diffuse the light beams to the outside of the holder base. Thus, the light transmission section of the holder base generates a floodlight effect due to light scattering. Furthermore, the illuminated water bottle cage according to the present invention not only uses the light source of the lighting device to provide the effect of nighttime warning but uses the light transmission section of the holder base to achieve an effect of diffusing the light source of the lighting device, effectively increasing the light scattering area and indeed enhancing the function of nighttime warning.

2. The illuminated water bottle cage according to the present invention uses a small-size light-emitting diode as the lighting element without the need of increasing the size of the lighting element and without the need of adding a reflective cover, effectively controlling the manufacturing costs and saving electricity while essentially increasing the light scattering area of the illuminated water bottle cage and indeed enhancing the effect of nighttime warning.

3. In the illuminated water bottle cage according to the present invention, the back, the bottom, and the sliding block of the restraining portion of the holder base are made of transparent or translucent materials. The back, the bottom, and the sliding block of the restraining portion of the holder base form the light transmission section. Namely, the incident portion of the holder base is aligned with the light source of the lighting device. The back, the bottom, and the sliding block of the holder base directly form the light guiding portion. However, the present invention is not limited to this arrangement. A light transmission section formed by the whole holder base is an equivalent arrangement within the scope of the present invention.

4. In the illuminated water bottle cage according to the present invention, the holder base includes a groove adjacent to the incident portion. The lighting device is mounted in the groove. The light source of the lighting device is aligned with the incident portion of the light transmissions section. Thus, the lighting device will not collide with an alien object, avoiding damage due to collision.

5. In the illuminated water bottle cage according to the present invention, a soft button is mounted between the through-hole of the holder base and the switch of the lighting device, and a seal ring is mounted between the opening of the holder base and the cover of the lighting device. The soft button and the seal ring can prevent dust from entering the groove to achieve a dust-preventing effect and a rainproof effect, effectively prolonging the service life.

6. If the illuminated water bottle cage according to the present invention is out of electricity, the user can detach the cover from the holder base by the actuating portions on the upper and lower sides of the cover and then replace a new battery. Then, the cover is pushed back into the groove of the holder base. It is not necessary to detach the illuminated water bottle cage from the bicycle during replacement of the battery, which is very simple and convenient in use.

Although preferred embodiments of the present invention have been illustrated and described, they should not be construed to restrict the scope of the present invention. Therefore, modifications to numerical values or substitution of equivalent elements thereof or equivalent changes and modifications based on the accompanying claims of the present invention still fall within the scope covered by the present invention.

The invention claimed is:

1. An illuminated water bottle cage comprising:

a holder base including a coupling portion on a side thereof, with the coupling portion adapted to be mounted to a bicycle, with the holder base including a receiving space extending along a longitudinal axis of the holder base, with the receiving space adapted to receive a water bottle, with the holder base including a light transmission section, and with the light transmission section including an incident portion and a light guiding portion; and a lighting device mounted in the light transmission section of the holder base, with a light source of the lighting device projected onto the incident portion of the light transmission section, allowing light beams projected onto the incident portion to be transmitted to the light guiding portion, and diffusing the light source of the lighting device to the light transmission section of the holder base.

2. The illuminated water bottle cage according to claim 1, with the holder base including a groove adjacent to the incident portion, with the lighting device mounted in the groove, and with the light source of the lighting device aligned with the incident portion of the light transmission section.

3. The illuminated water bottle cage according to claim 2, with the groove including a through-hole, with the lighting device including a switch and a lighting element, with the switch fixed in the through-hole of the holder base, with the switch adapted to be pressed by a user via the through-hole, with the lighting element fixed in the groove of the holder base and connected to the switch, and with the light source of the lighting element aligned with the incident portion of the holder base, such that the light source of the lighting element can be projected onto the incident portion of the light transmission section.

4. The illuminated water bottle cage according to claim 3, with the groove further including an opening, with the opening and the through-hole located on opposite sides of the holder base, with the lighting device further including a cover, with the cover detachably mounted in the opening of the holder base, and with the cover adapted to receive a battery for supplying power to the lighting element.

5. The illuminated water bottle cage according to claim 4, with an engaging protrusion formed in the groove and located adjacent to the opening, with the cover including a hook in a location corresponding to the engaging protrusion of the groove, and with the hook engaged with the engaging protrusion of the groove to prevent the cover from inadvertently disengaging from the groove.

6. The illuminated water bottle cage according to claim 5, with the cover including an actuating portion on each of upper and lower sides of the cover, and with the actuating portions exposed outside of the opening of the groove, allowing the user to detach the cover from the holder base.

7. The illuminated water bottle cage according to claim 6, with a soft button mounted between the through-hole and the switch, with a seal ring mounted between the opening and the cover, with the soft button and the seal ring 36 adapted to prevent dust from entering the groove to achieve a dust-preventing effect and a rainproof effect.

8. The illuminated water bottle cage according to claim 2, with the holder base including a back connected to the coupling portion, a restraining portion for restraining the water bottle, and a bottom for supporting the water bottle, with the back, the restraining portion, and the bottom together defining the receiving space, with the back and the restraining portion located in a radial direction of the receiving space to restrain movement of the water bottle in the radial direction, with the bottom located below the receiving space for supporting a weight of the water bottle, and with the light transmission section of the holder base made of a transparent or translucent material.

9. The illuminated water bottle cage according to claim 8, with the back, the bottom, and the restraining portion of the holder base integrally connected with each other, and with the groove formed in an intersection between the back and the bottom.

10. The illuminated water bottle cage according to claim 9, with the back, the bottom, and the restraining portion together forming the light transmission section, with the incident portion of the holder base formed in a location corresponding to the light source of the lighting device, and with the back, the bottom, and the restraining portion of the holder base forming the light guiding portion.

11. The illuminated water bottle cage according to claim 8, with the back and the bottom of the holder base integrally connected with each other, with the groove formed in an intersection between the back and the bottom, with the restraining portion slideably mounted to the bottom of the holder base, and with the restraining portion movable towards or away from the back to adjust an effect of adjusting size of the receiving space for water bottles of various sizes.

12. The illuminated water bottle cage according to claim 11, with the restraining portion including an enclosure frame, a sliding block mounted to a bottom of the enclosure frame, a threaded member and the bottom, and a rotary wheel in threading connection with the threaded member, and with the rotary wheel adapted to be operated by the user to tighten or loosen the threaded member for adjusting a position of the restraining portion or fixing the restraining portion.

13. The illuminated water bottle cage according to claim 12, with the back, the bottom, and the sliding block of the restraining portion of the holder base forming the light transmission section, with the incident portion of the holder base formed in a location corresponding to the light source of the lighting device, and with the back, the bottom, and the sliding block of the restraining portion of the holder base forming the light guiding portion.

* * * * *